Feb. 25, 1936. L. M. SAWIN 2,031,908
APPARATUS FOR TREATING TOASTED NUTS
Filed Aug. 14, 1933
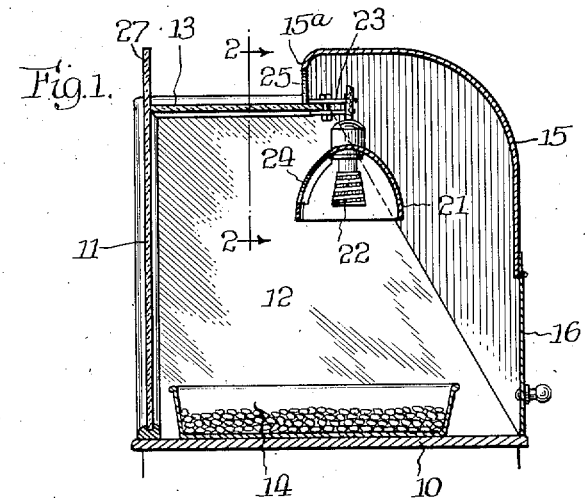
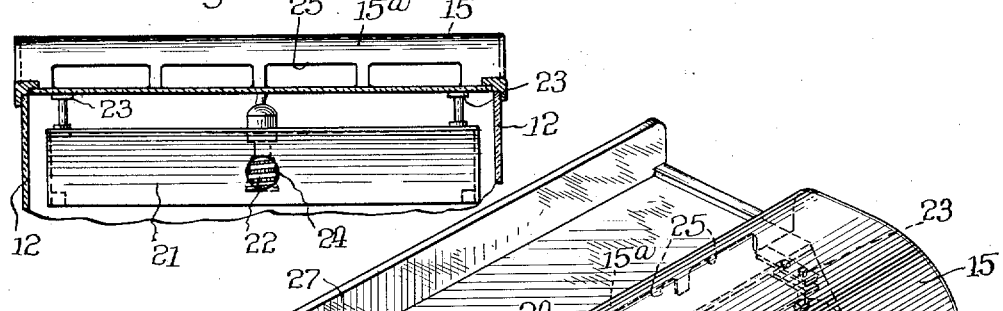
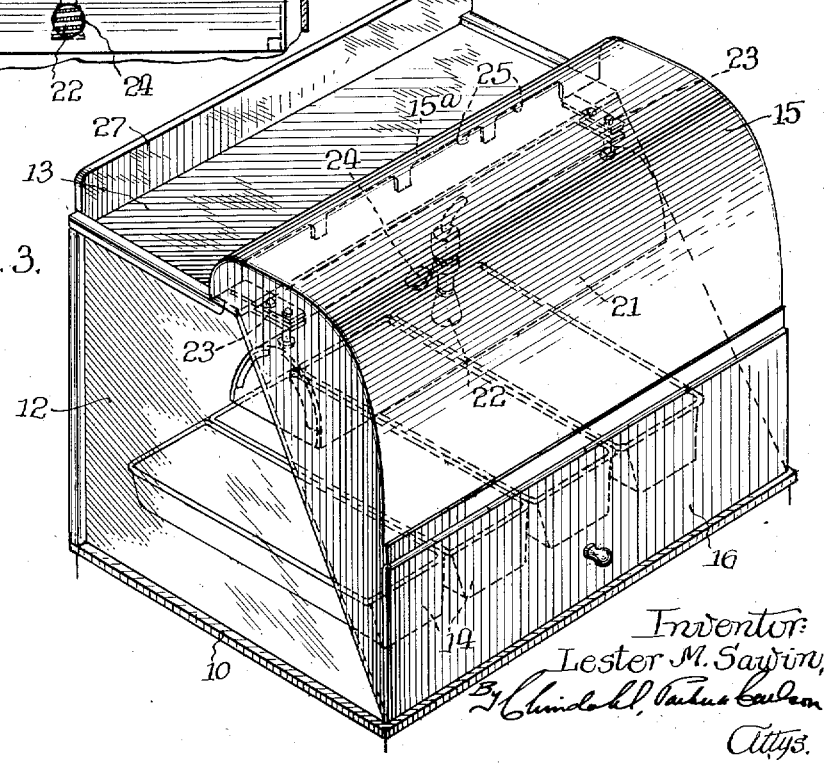
Inventor:
Lester M. Sawin, Patented Feb. 25, 1936

2,031,908

UNITED STATES PATENT OFFICE 2,031,908

APPARATUS FOR TREATING TOASTED NUTS

Lester M. Sawin, Chicago, Ill.; Emilyn J. Sawin, administratrix of said Lester M. Sawin, deceased, assignor to The Susu Nut Company, Chicago, Ill., a corporation of Illinois Application August 14, 1933, Serial No. 685,050

3 Claims. (Cl. 219—35)

The invention relates to an apparatus for treating nut meats, and more particularly to an apparatus for use in treating previously toasted nut meats while on display for sale. For the sake of brevity the term "nuts" will be hereinafter used to denote "nut meats".

The primary object of the invention is to provide a display apparatus of an advantageous character whereby nuts previously prepared by toasting in an edible oil may be restored to their original state of freshness and maintained in such condition while on display.

In the preparation of nuts for retail distribution, it is desirable that they be heated in order to restore them to the condition which they are in when initially prepared at the factory. In most instances, the nuts are seasoned by the application thereto of salt either at the factory or in the retailer's shop. In preparing the nuts for sale, a common practice employed by retailers has been to place the nuts in a heated container which is equipped with agitating means for the purpose of effecting a uniform distribution of heat to the nuts. This method of treatment has proven objectionable for the reason that when the nuts are agitated while being heated, the salt constitutes an abrasive agent, with the result that the skins of some of the nuts, such as pecans, are removed in part, and further the nuts become pitted and acquire an unsightly and a generally unsalable condition.

With this difficulty in view, a further object of my invention is to provide an improved display apparatus for nuts having provision for restoring the nuts to their original freshness by the application of heat thereto in a manner such as to avoid the injurious agitation referred to.

Another object is to provide a display apparatus embodying a substantially closed display chamber for the nuts and means of an advantageous character for applying radiant heat substantially uniformly over the top surface area of the nuts when placed within a series of contiguous trays in said chamber.

A further object is to provide an apparatus having a display chamber and a shelf externally of the chamber arranged to receive heat from the chamber, thereby permitting packaged nuts placed on the shelf to be maintained in a heated condition.

Still another object is to provide a display case having the usual front, top and end walls of glass with a rear closure formed by a metallic hood having one or more doors therein through which access may be had to the interior of the case, and detachably mounted so as to permit of the convenient insertion and removal of nut trays.

The objects of the invention thus stated, together with other and ancillary advantages are obtained by the construction and arrangement in the accompanying drawing, in which:

Figure 1 is a transverse vertical sectional view through a display apparatus of preferred construction.

Fig. 2 is a fragmentary longitudinal sectional view taken approximately in the line of 2—2 of Fig. 1.

Fig. 3 is a perspective view of the apparatus.

As shown, the apparatus comprises a display case which is adapted to be supported upon a counter or other suitable supporting surface within a retail shop. This case is formed in part by a bottom wall or base 10, a front wall 11, end walls 12 and a relatively narrow top wall 13, the rear edges of the end walls being inclined downwardly and rearwardly from the rear edge of the top wall to the rear edge of the bottom wall. Preferably, the front, end and top walls are made of glass to render readily visible the nuts on display in trays 14 placed within the case.

The case is completed by a metallic hood 15 which may be of stainless steel or the like, and which is shaped to cooperate with the top, bottom and end walls so as to form an enclosure having a substantially rectangular cross section. At its upper forward edge the hood has a depending flange 15ª resting upon the rear edge portion of the top wall 13, and the lower edge of the hood is adapted to rest on the lower rear edge portion of the base wall 10 with the end walls of the hood slightly overlapping the rear edge portions of the glass end walls 12. Near its lower edge, the hood is equipped with a suitable hinged door 16 through which access into the interior of the case is permitted for the purpose of removing nuts for sale, the trays 14 being arranged side by side on the base 10 in contiguous relation. The hood is made removable in order that it may be lifted conveniently from its position for the purpose of inserting and removing the trays.

In practice, the nuts as supplied to the retailer have previously been prepared by toasting in an edible oil. However, as an incident to the cooling of the nuts, the oil becomes absorbed by the nuts and the nuts therefore acquire a dull unattractive appearance. Where the nuts as supplied have not been seasoned with salt, the retailer usually supplies the salt and effects its distribution by stirring the nuts gently within the trays.

To restore the nuts to their original freshness, means is provided for applying heat thereto, and preferably the means employed for this purpose is in the form of a radiant heater suspended in the upper portion of the display chamber, and so designed as to effect uniform distribution of the heat to the top layer of nuts within the trays. It is to be observed in this connection that the nuts are spread out so as to form a relatively large top surface area which is exposed to the heat, and the temperature maintained at the surface of the nuts is not sufficiently high as to burn the nuts. As a result of such application of heat to the nuts, the original fresh condition and oily appearance is restored thereto.

The heater employed in the present instance comprises an elongated reflector 21 extending longitudinally of the display chamber and a single electric heating element 22 disposed centrally within the reflector. The latter has a parabolic cross section and is closed at its opposite ends so that the heat rays travel longitudinally of the reflector and thence downwardly therefrom over the nut products contained in the trays.

It has been found that with this arrangement, the heat is distributed substantially uniformly over the trays, and the complete enclosure of the trays serves to confine the heat so as to utilize the same effectually. In view of the absence of any means for agitating the nuts, it is important that the heater be supported substantially above the trays so that the temperature at the surface of the nuts is not sufficiently high to burn the same.

To support the heater, suitable spring clips 23 are attached to the reflector near opposite ends thereof, and these clips are adapted to be engaged with the rear edge portion of the top wall 13. Thus, the heater is supported independently of the hood so as to permit removal of the latter without disturbing the heater. Also, it will be observed, the heater is preferably disposed over the rear ends of the trays so as to direct a slightly greater amount of heat to such portions than to the front ends of the trays to compensate for the tendency on the part of the clerk to remove the nuts at the rear.

In order that the glow of the heating element may be visible to an observer stationed in front of the apparatus, an aperture 24 may be provided in the forward side of the reflector opposite the heating element.

To provide an external supporting shelf upon which packaged nuts may be placed and maintained in a warmed condition, the top wall of the case is utilized as a shelf. Heat is supplied to this shelf through apertures 25 in the depending flange 15ᵃ of the hood. If desired, the front wall 11 of the case may be extended upwardly as indicated at 27 in order better to retain the packages in position on the shelf.

I claim as my invention:

1. An apparatus for treating nuts comprising, in combination, a display case having a flat top wall, means within the case for supporting unpackaged nuts, a radiant heater within the case for directing heat downwardly onto the nuts, and a hood closing the rear side of the case and having a portion resting on the rear edge of the top wall, said portion having forwardly opening vents permitting hot air to pass out of the case over the top wall thereof whereby packaged nuts resting on said top wall may be kept warm.

2. A display apparatus for heating nuts while on display comprising a base adapted to support open-top containers for the nuts, a casing resting on said base for enclosing said containers and having front and end walls of glass whereby the nuts are prominently displayed, a metallic rear wall having a hinged door in the lower portion thereof to provide access to the containers, and a top wall constituting a shelf for supporting packages of nuts, and heating means within said case suspended from said top wall for transmitting heat downwardly onto the nuts while on display.

3. A display apparatus for heating nuts while on display comprising a base adapted to support a container for the nuts, a case resting on said base having front and end walls of glass whereby the nuts are prominently displayed, a rear wall having an opening in the lower portion thereof to provide access to said container, and a top wall constituting a shelf for supporting packages of nuts, and heating means within said case suspended from said top wall for transmitting heat downwardly onto the nuts while on display.

LESTER M. SAWIN.